United States Patent Office 3,057,833
Patented Oct. 9, 1962

3,057,833
PROCESS FOR POLYMERIZING ALLYLIC AMINES AND RESULTING PRODUCTS
Paul A. Devlin, Orinda, Calif., assignor to Shell Oil Company, New York, N.Y., a corporation of Delaware
No Drawing. Filed Mar. 31, 1958, Ser. No. 724,787
11 Claims. (Cl. 260—82.1)

This invention relates to the polymerization of unsaturated amines and the resulting products. More particularly, the invention relates to a process for polymerizing allylic amines and to the resulting homopolymers and copolymers.

Specifically, the invention provides for the first time an efficient process for polymerizing allylic amines having at least one allylic group attached directly to an amino nitrogen and containing no other ethylenically unsaturated group, such as, for example, monoally amine. This process broadly comprises heating the allylic amine in the presence of a dialkyl peroxide, such as, for example, di-tertiary butyl peroxide, at a temperature above 90° C. The invention further provides new homopolymers and copolymers of the above described allylic amines.

Allylic amines, such as mono allylic amines, are potentially cheap monomers and would be useful for preparing valuable polymeric polyamines. Methods used hereto, however, for polymerizing allylic amines have not been successful. As noted in U.S. 2,456,428 and U.S. 2,700,027, there has been, up to this time, no known method for polymerizing allylic amines directly. U.S. 2,456,428 discloses a method for first polymerizing an unsaturated nitrile and then hydrogenating the nitrile to form an amine. This process is rather expensive and gives products containing nitrile groups along with the amine groups. U.S. 2,700,027 discloses a method which is limited to the polymerization of chloroallyl tertiary amine with acrylontrile.

It is, therefore, an object of the invention to provide a new method for polymerizing allylic amines. It is a further object to provide a new method for producing homopolymers and copolymers of mono and polyallyl amines directly from the monomer. It is a further object to provide a new method for producing valuable copolymers from allylic amines. It is a further object to provide new homopolymers and copolymers of monoallyl and polyallyl amines which are particularly useful and valuable. It is a further object to provide new homopolymers and copolymers of allylic amines which are particularly useful as curing agents for epoxy resins. It is a further object to provide valuable allylic polymers which may be cured with polycarboxylic acids to form valuable insoluble products. It is a further object to provide resinous polyamines that are useful as ion-exchange resins. These and other objects of the invention will be apparent from the following detailed description thereof.

It has now been discovered that these and other objects of the invention may be accomplished by the process of the invention which comprises heating the allylic amines by themselves or in combination with other ethylenically unsaturated monomers in the presence of a dialkyl peroxide, such as ditertiary butyl peroxide at a temperature above 90° C. It has been found that by the use of this special process, the allylic amines can be easily homopolymerized and copolymerized directly to form valuable polymeric products. The dialkyl peroxides appear to be specific for this reaction and give products which are different than those obtained by the use of other peroxide-type polymerization catalyst.

It has also been found that the new homopolymers and copolymers prepared by the process of the invention have special structure characteristics which make them particularly valuable and useful in industry. The polymers, and particularly the copolymers prepared from the ethylenically unsaturated hydrocarbon such as styrene and butadiene, have been found to be particularly useful as curing agents for epoxy resins. The new polymers have also been found to be particularly useful in making insoluble, infusible plastic products by further reaction with polybasic acids and anhydrides. The insoluble polymers of the invention are useful as ion-exchange resins.

The allylic amines to be polymerized by the process of the invention include those organic and inorganic amines having at least one allylic group attached directly to an amino nitrogen and containing no other unsaturated linkage. The expression "allylic" refers to the grouping

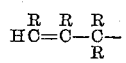

wherein R is preferably a hydrogen or hydrocarbon radical containing up to 10 carbon atoms. Examples of these compounds include, among others, allylamine, diallylamine, triallylamine, methallylamine, dimethallylamine, trimethallylamine, N-allyl N-butylaniline, N,N-diallylaniline, N,N'-diallyl, N,N'-dihexyldiaminophenylsulfone, N,N'-diallyl, N,N'-dibutyl methylene dianiline, N-allyl morpholine, N-allyl N-butylamine, N-methallyl N-butylamine, N,N-diethyl allylamine, N-cyclohexyl N-allylamine and N-benzyl N-allylamine.

Preferrd allylic amines included the mono-, di- and triallyl amine, N-allyl monoalkylamines, N,N-diallyl alkylene diamines, the N-allyl N-alkyl aromatic amines and N,N-diallyl N,N-dialkyl aromatic diamines all containing up to 20 carbon atoms and preferably 1 to 15 carbon atoms.

The above-described allylic amines can be polymerized alone or in combination with other ethylenically unsaturated monomers, i.e., monomers containing at least one $>C=C<$ group. Included within this group of compounds are the polyunsaturated hydrocarbons, such as the diolefins as butadiene-1,3, 2,3-dimethylbutadiene, piperylene, isoprene, chloroprene, and others, such as divinylbenzene, diallyl, divinyl naphthalene, and the like; the monoethylenically unsaturated hydrocarbons, such as styrene, alpha-methylstyrene, allylbenzene, vinyl naphthalene; the esters of unsaturated acids, such as methyl methacrylate, butyl acrylate, ethyl acrylate, butyl butenoate and propyl hexenoate; the vinylidene halides, such as vinylidene chloride and vinylidene bromide; the vinyl esters of inorganic acids, such as vinylchloride, vinyl bromide, acrylonitrile and methacrylonitrile; the vinyl esters of monocarboxylic acids, such as vinyl acetate, vinyl chloroacetate, vinyl benzoate, vinyl valerate and vinyl caproate; the vinyl and allylic esters of polycarboxylic acids, such as divinyl phthalate, diallyl phthalate, allyl vinyl phthalate, divinyladipate, vinyl methyl glutarate, and vinyl allyl adipate; the vinyl ethers, such as vinyl ethyl ether, vinyl butyl ether, vinyl allyl ether and vinyl hexyl ether; and the vinyl ketones, such as vinyl ethyl ketone, vinyl butylketone ahd isopropenyl ethyl ketones; and the unsaturated esters of unsaturated acids, such as allyl acrylate, allyl crotonate, methallyl methacrylate and the like.

A particularly preferred group of compounds to be copolymerized with the allylic amines by the present process are the unsaturated hydrocarbons, such as the polyolefins and the alkenyl-substituted aromatic compounds, and preferably those containing not more than 12 carbon atoms, and especially those containing from 4 to 8 carbon atoms.

The allylic amine homopolymers and copolymers described above are prepared by heating the monomer or mixture of monomers in the presence of the dialkyl peroxides at a temperature above 90° C. The polymerization may be accomplished in bulk or in solvent solution. If solvents are employed, they may be inert liquids and preferably inert hydrocarbons, such as benzene, toluene, xylene, cyclohexane and the like.

The catalysts required to be used in the process are the dialkyl peroxides and preferably the ditertiary alkyl peroxides. Examples of these include, among others, ditertiary butyl peroxide, ditertiary amyl peroxide, ditertiary hexyl peroxide, ditertiary octyl peroxide, dibutyl peroxide, diamyl peroxide, ethyl hexyl peroxide, dihexyl peroxide, di-sec-butyl peroxide and didodecyl peroxide. Especially preferred are the peroxides possessing no more than 12 carbon atoms in each alkyl group, and especially the ditertiary alkyl peroxides wherein the alkyl groups contain from 2 to 8 carbon atoms each.

The amount of catalyst employed will vary over a considerable range depending upon the particular reactants and conditions employed. In most cases, the amount of catalyst employed will vary between about .1% to about 5% by weight of the monomer to be polymerized. A preferred amount of catalyst will vary from about 1% to 5% by weight. The temperature used in the process should be above 90° C. and preferably above 100° C. Especially preferred temperatures range from 100° C. to about 200° C. Atmospheric, reduced or superatmospheric pressures may be employed as desired. If desired, the polymerization may be conducted in the absence of oxygen, i.e., under a blanket of an inert gas, such as nitrogen, carbon dioxide, methane and the like.

In the case of the polyunsaturated monomers, the polymerization may be interrupted at any stage to form an intermediate product and this then may be worked before polymerization is completed.

At the end of the process, the unreacted monomer or monomers can then be removed by conventional means, such as distillation, extraction, and the like.

The polymerization may be carried out either batchwise or as a semi-continuous or continuous process. One or more reactants or catalysts may be added portionwise or continuously during the polymerization and the reactor may be discharged at intervals. Continuous operation is usually preferred as it offers the technical advantages of speed, economy of operation and accuracy of control of the reaction.

In preparing the copolymers, it is preferred to prepare products having substantially homogeneous composition, i.e., those wherein each of the macromolecules having the various monomer units in substantially the same mol ratio. This may be accomplished by various means. One way, for example, comprises stopping the copolymerization after the ratio of monomer concentrations has reached a point where the monomer units are entering the polymer chain at a rate which is different from that in which they entered the initial polymer chains. This method is of particular value if the change in the ratio between the monomer concentrations during the copolymerization is slow and a considerable yield of copolymer has been obtained before the limiting values have been attained.

Another method is to adjust the ratio between the monomer concentrations by adding monomer during the course of the polymerization. In this case, it is sufficient to add the monomer that is being consumed at the fastest rate. Such addition may be periodic or continuous.

To obtain copolymers wherein the greatest part of their macromolecules have the same composition and thus display their superior properties to the highest extent, it is preferred to keep the concentrations of the monomer constant as well as the ratio of concentrations constant. This is preferably obtained by adding all of the monomers at the rate at which they are consumed. This greatest uniformity of conditions is generally obtained in a continuous process whereby copolymerization takes place in a space from which the copolymer is drained off at the rate at which it is formed and in which the feed of monomers and other substances employed in the copolymerization exactly compensate for the consumption and drainage taking place when the copolymer is removed.

Polymers produced by the process of the invention having the aforementioned superior properties preferably have molecular weights ranging from about 500 to about 10,000 or higher as determined by the light scattering technique described in Chem. Rev., vol. 40, page 319 (1948). Preferred molecular weights range from 500 to about 5,000.

The molecular weight can be controlled by varying the conditions affecting molecular weight. Factors which exert an influence on the molecular weight of the polymer includes, the presence of diluents, the concentration catalyst, the temperature and the nature and amount of monomer and presence of added chain transfer agents. When the polymerization is accomplished in solution the molecular weight of the product will be lower when the dilution is stronger, i.e., when the concentration of solvent is greater, in general, the higher the polymerization temperature, the lower will be the molecular weight of the finished copolymer.

The polymers and copolymers prepared by the process of the invention will vary from very viscous liquids to hard solids. Those prepared from mono-substituted amines will possess a plurality of free amine groups. The polymer prepared from the monoethylenically unsaturated monomers will also be linear in nature and soluble in solvents, such as chloroform and benzene. The polymers prepared from the polyethylenically unsaturated monomers will vary in the degree of insolubility depending on the amount of the polyethylenically unsaturated materials. Generally, those polymers prepared from mixtures containing at least 80% polyethylenically unsaturated monomer will be insoluble in solvents, such as benzene and toluene.

As noted in the case of the monomers having polyethylenically unsaturated groups, such as, for example, diallylamine, it is possible to stop the polymerization prior to completion so as to obtain a prepolymer which is still soluble and this may be further worked or reacted before being converted to the insoluble, infusible form.

The polymers of the present invention may be used for a variety of very useful applications. As they possess a variety of amine groups, they may be reacted, for example, with polycarboxylic acids, such as adipic acid, phthalic acid, oxalic acid, succinic acid and the like to form cross-linked polyamides which are insoluble and infusible. The primary amines may also be reacted with polyisocyanates to form valuable polyurethanes. Such polyamides are useful in the preparation of coatings and castings.

The insoluble polymers of the invention may be valuable as ion-exchange resins.

The new resinous polymers and copolymers are also useful and valuable as curing agents for polyepoxides. Examples of polyepoxides that may be cured with the claimed polymers are given in U.S. 2,633,458.

The polyepoxides may be cured with the claimed polymers by merely mixing the two together. The reaction occurs slowly at temperatures as low as about 20° C. and for best results it is best to heat the mixture between about 40° C. and about 200° V. Particularly preferred temperatures range from about 40° C. to about 150° C.

The amount of curing agent employed in the reaction with the polyepoxides may vary over a considerable range. Amounts of polymer can range from about 5 parts (per 100 parts of polyepoxide) up to about 50 parts (per 100 parts of polyepoxide). Best results are obtained, however, when the polymer is employed in amounts ranging from about 10 to 50 parts per 100 parts of polyepoxide In curing the polyepoxides, it is usually desirable to have the polyepoxide in a mobile condition when the curing agent is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of polyepoxide. These may be volatile solvents which escape from the polyepoxide compositions containing the adduct by evaporation before or during the curing such as ketones like acetone, methyl ethyl ketone, methyl isobutyl ketone, isophorone, etc. esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons, such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide.

Various other ingredients may be mixed with the polyepoxides to be cured with the novel polyamines, such as pigments, fillers, dyes, plasticizers, resins, and the like.

The polyepoxides cured with the new polyamines are useful in the preparation of laminates, coating compositions and castings.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

*Example I*

This example illustrates the preparation of a copolymer of allylamine and styrene using ditertiary butyl peroxide.

80 parts of allylamine was combined with 20 parts of styrene and 2 parts ditertiary butyl peroxide and the mixture heated for 5 hours at 140° C. At the end of that time, the excess monomer was taken off at 150° C. and 2 mm. Resulting product was a hard amber solid having a nitrogen content of 3% and mol wt. of 1245.

50 parts of the copolymer produced above is combined with 100 parts of a liquid diglycidyl ether of 2,2-bis(4-hydroxyphenyl)propane and the mixture heated at 100° C. for several hours. The resulting product is a hard insoluble, infusible product.

*Example II*

90 parts of allylamine and 10 parts of styrene were combined with 2 parts of ditertiary butyl peroxide and the mixture heated for 5 hours at 140 C. At the end of that time, the excess monomer was taken off overhead at 150° C. and 2 mm. The resulting product was a hard amber solid having a nitrogen content of 4.48%.

50 parts of the copolymer produced above is combined with 100 parts of a liquid diglycidyl ether of 2,2-bis(4-hydroxyphenyl) propane and the mixture heated at 100° C. for several hours. The resulting product is a hard insoluble, infusible product.

*Example III*

This example illustrates the preparation of a copolymer of allylamine and butadiene using ditertiary butyl peroxide.

150 parts of allylamine was combined with 20 parts of butadiene and 4 parts ditertiary butyl peroxide and the mixture heated for 4 hours at 140° C. At the end of that time, the excess monomer was removed at 107° C. (4 mm.). The product was an amber rubber solid which was soluble in chloroform and had a nitrogen content of 4.2%.

50 parts of the copolymer produced above is combined wtih 100 parts of a liquid diglycidyl ether of 2,2-bis(4-hydroxyphenyl) propane and the mixture heated at 100° C. for several hours. The resulting product is a hard insoluble product.

*Example IV*

This example illustrates the preparation of a copolymer of allylamine and methyl methacrylate using ditertiary butyl peroxide.

80 parts of allylamine was combined with 20 parts of methyl methacrylate and 2 parts of ditertiary butyl peroxide and the mixture heated for 5 hours at 140° C. At the end of that time, the unreacted monomer was removed overheat to give a solid resin which is soluble in chloroform and possesses a plurality of free amine groups. Primary amine content of 0.20 eq./100 g. and a nitorogen content of 8%.

*Example V*

This example illustrates the preparation of a copolymer of diallylamine and styrene.

90 parts of diallyl amine and 10 parts of styrene and 2 parts of ditertiary amyl peroxide are combined and the mixture heated at 140° C. This yields a resinous polymer.

*Example VI*

This example illustrates the preparation of a copolymer of N-allyl aniline and butadiene using ditertiary butyl peroxide.

70 parts of N-allyl N-butyl aniline and 30 parts of butadiene and 2 parts of ditertiary butyl peroxide are combined and the mixture heated at 140° C. At the end of that time, the unreacted monomer is removed yielding resinous polyamine.

*Example VII*

Examples I to V are repeated with the exception that the peroxide employed is ditertiary hexyl peroxide and ditertiary octyl peroxide. Similar products are obtained.

*Example VIII*

Examples I to VI are repeated with the exception that the polymerization is conducted in the presence of benzene. After removing the solvent, related products are obtained.

*Example IX*

50 parts of the copolymer of allylamine and styrene prepared in Example I are combined with 50 parts of phthalic anhydride and the mixture heated at 100° C. The resulting product is a hard insoluble, infusible casting.

I claim is my invention:

1. A copolymer comprising the product of reaction of an allylic amine having at least one allyl group attached to an amino nitrogen and containing no other aliphatic carbon-to-carbon unsaturated linkage and a dissimilar ethylenically unsaturated hydrocarbon, said copolymer having an average molecular weight of from 500 to 5000 as determined by the light scattering technique and containing at least 70% by weight of allylic amine.

2. A copolymer of diallyl amine and alkenyl-substituted aromatic hydrocarbon, said copolymer having an average molecular weight of from 500 to 5000 as determined by the light scattering technique and containing at least 70% by weight of diallyl amine.

3. A copolymer of diallyl amine and styrene having an average molecular weight of from 500 to 5000 as determined by the light scattering technique and containing at least 70% by weight diallyl amine.

4. A copolymer of diallyl amine and butadiene having an average molecular weight of from 500 to 5000 as determined by the light scattering technique and containing at least 70% by weight diallyl amine.

5. A process for producing copolymers from allylic amines of the group consisting of monoallyl amine, diallyl amine, triallyl amine, monomethallyl amine, dimethallyl amine and trimethallyl amine which comprises heating the allylic amine in admixture with a dissimilar ethylenically unsaturated hydrocarbon in the presence of a dialkyl peroxide at a temperature above 90° C., said copolymers containing at least 70% by weight of allylic amines.

6. A process as in claim 5 wherein the dialkyl peroxide is a ditertiary alkyl perxoide.

7. A process as in claim 5 wherein the dialkyl peroxide is ditertiary butyl peroxide.

8. A process as in claim 5 wherein the process is conducted at a temperature between 90° C. and 150° C.

9. A process as in claim 5 wherein the allylic amine is monoallyl amine and the dissimilar unsaturated compound is styrene.

10. A process as in claim 5 wherein the allylic amine is monoallylic amine and the dissimilar unsaturated compound is butadiene.

11. A process as in claim 5 wherein the polymerization is conducted in the presence of an inert solvent.

References Cited in the file of this patent

UNITED STATES PATENTS

| | | |
|---|---|---|
| 2,456,428 | Parker | Dec. 14, 1948 |
| 2,592,218 | Weisgerber | Apr. 8, 1952 |
| 2,626,946 | Price et al. | Jan. 27, 1953 |
| 2,662,875 | Chaney | Dec. 15, 1953 |
| 2,700,027 | Bruson | Jan. 18, 1955 |
| 2,712,004 | Thomas | June 28, 1955 |
| 2,762,790 | Greene | Sept. 11, 1956 |
| 2,810,716 | Markus | Oct. 22, 1957 |
| 2,840,550 | Price et al. | June 24, 1958 |
| 2,871,229 | Price | Jan. 27, 1959 |